United States Patent [19]

Wakita

[11] 4,088,101
[45] May 9, 1978

[54] EXHAUST GAS PURIFYING APPARATUS

[75] Inventor: Nobuaki Wakita, Susono, Japan

[73] Assignee: Toyota Jidosha Kogyo Kabushiki Kaisha, Toyota, Japan

[21] Appl. No.: 693,123

[22] Filed: Jun. 4, 1976

[30] Foreign Application Priority Data

Dec. 27, 1975 Japan .................................. 50-156491

[51] Int. Cl.$^2$ ............................................. F02M 23/08
[52] U.S. Cl. .................................. 123/119 A; 60/278; 123/119 D; 123/124 R
[58] Field of Search ......... 60/278; 123/119 A, 119 D, 123/119 DB, 124 R

[56] References Cited

U.S. PATENT DOCUMENTS

| | | | |
|---|---|---|---|
| 3,796,049 | 3/1974 | Hayashi | 123/119 A X |
| 3,885,538 | 5/1975 | Suter | 123/119 A |
| 3,928,966 | 12/1975 | Goto et al. | 123/119 A X |
| 3,974,807 | 8/1976 | Nohira et al. | 123/119 A |
| 3,977,375 | 8/1976 | Laprade et al. | 60/276 X |
| 3,978,834 | 9/1976 | Arnaud et al. | 123/119 A |

FOREIGN PATENT DOCUMENTS 2,547,546  5/1976  Germany .......................... 123/119 A Primary Examiner—William L. Freeh
Assistant Examiner—Michael Koczo, Jr.
Attorney, Agent, or Firm—Stevens, Davis, Miller & Mosher

[57] ABSTRACT

An exhaust gas purifying apparatus for use in connection with an internal combustion engine, especially for an automobile. The apparatus includes a fluid flow changeover valve having an outlet connected to the intake system of the engine, an exhaust gas inlet connected to the exhaust system and an air inlet connected to a source of pressurized air, for example, an air pump driven by the engine. When rotation of the engine is slow and consequently the output pressure of the air source is low, supply of the air to the intake system is stopped but exhaust gas is supplied thereto, whereby generation of nitrogen oxides (NOx) is reduced. In response to increase in the engine speed, air and exhaust gas are both supplied to the intake system until the output pressure of the air source increases to a predetermined value, whereby uniform combustion of fuel-air mixture in cylinders is maintained. When the output pressure of the air source exceeds the predetermined value, supply of exhaust gas to the intake system is stopped but only air is supplied thereto, causing dilution of fuel-air mixture provided through the carburetor, whereby fuel consumption is decreased and overheating of the exhaust gas purifying apparatus is prevented.

6 Claims, 4 Drawing Figures

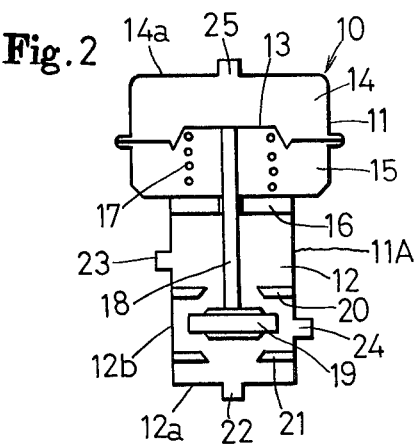
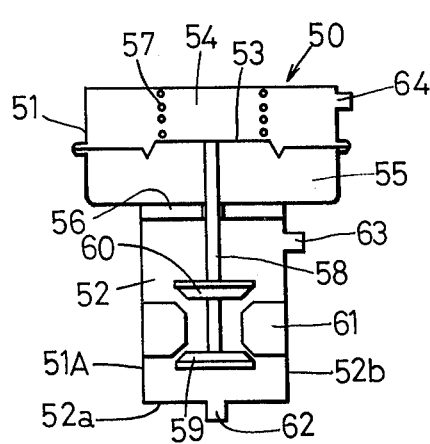
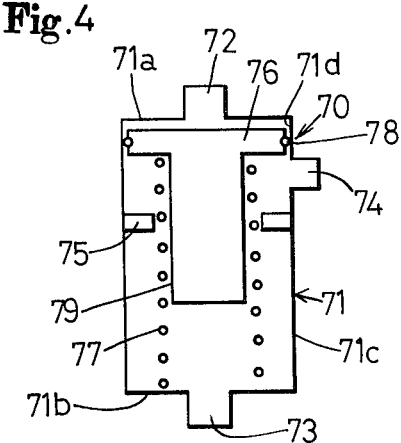

EXHAUST GAS PURIFYING APPARATUS

BACKGROUND OF THE INVENTION

This invention relates to an exhaust gas purifying apparatus for use with an internal combustion engine, especially for an automobile. There is known an exhaust gas re-circulating system which is adapted for reducing the amount of nitrogen oxides (NOx) by re-circulating part of exhaust gas from an engine into its inlet side. There is also another apparatus which purifies exhaust gas by introducing additional air into the outlet side of the engine and burning carbon monoxide (CO) and residual hydrocarbons contained in the exhaust gas. In a known automobile engine, these two systems are generally controlled independently of each other, causing complication of the control system and high production cost. Furthermore, use of these apparatus tends to increase fuel consumption.

SUMMARY OF THE INVENTION

It is accordingly an object of this invention to provide an apparatus for reducing effectively the amounts of NOx, CO and residual HC exhausted from an internal combustion engine.

Another object of this invention is to provide an apparatus adapted for supplying additional air into the intake manifold of an engine to thereby dilute a fuel-air mixture, whereby the fuel consumption of the engine is decreased and an exhaust gas purifying apparatus, including a catalyst and a reactor is prevented from being overheated.

A further object of this invention is to provide an apparatus which prevents unsteady combustion in the cylinders by supplying appropriate amounts of air and exhaust gas into the intake side of the engine.

BRIEF DESCRIPTION OF THE DRAWING

FIG. 2 is a longitudinal sectional view of the fluid flow changeover valve employed in the apparatus of FIG. 1;

FIG. 3 is a longitudinal sectional view of the flow rate control valve; and

FIG. 4 is a longitudinal sectional view of another form of the fluid flow changeover valve.

DETAILED DESCRIPTION OF THE INVENTION

Figure 1:
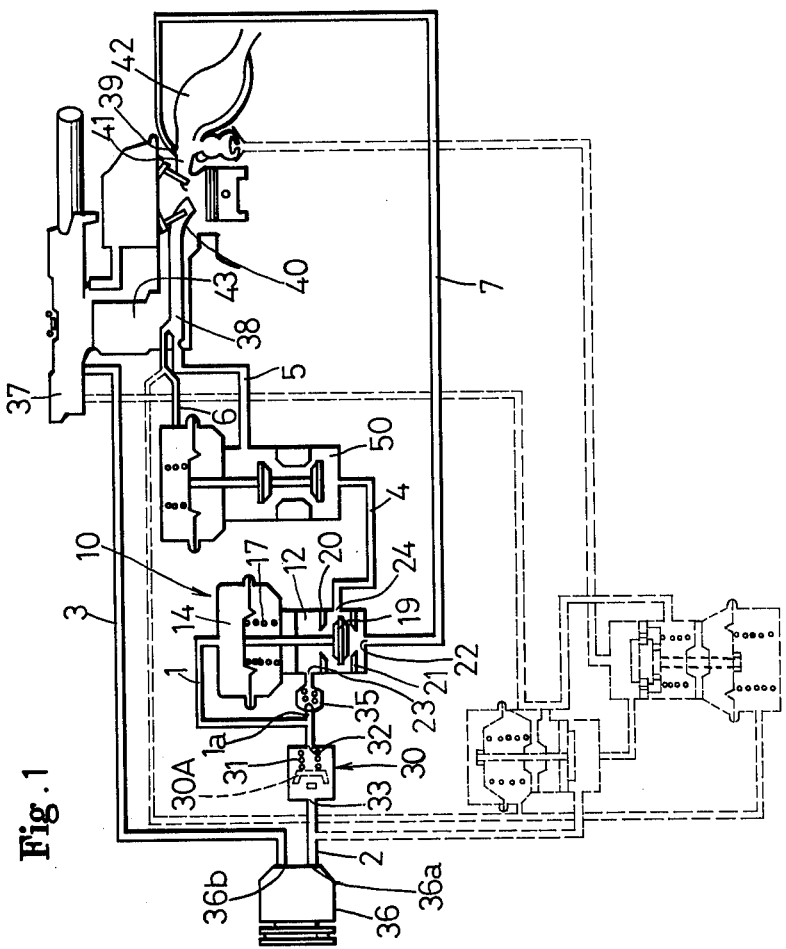
FIG. 1 is a schematic diagram of an embodiment of the invention.

Referring to FIGS. 1 and 2 of the drawings, the apparatus of this invention includes a fluid flow changeover valve 10 adapted to cause selective flow therethrough of air, or exhaust gas recirculated from the outlet of an engine, or both. The valve 10 comprises an upper housing 11 and a lower housing 11A integrally connected to the upper housing 11 and defining a cylindrical valve chamber 12 therein. The upper housing 11 includes a diaphragm 13 which defines a pressurized air chamber 14 connected to a source of air under pressure and an atmospheric pressure chamber 15 maintained in a fluid-tight relationship to the pressurized air chamber 14. The atmospheric pressure chamber 15 includes a compression spring 17 and is sealed against the valve chamber 12 by a partition 16. A valve stem 18, secured to the diaphragm 13 at its upper end, extends downwardly through the partition 16 in a fluid tight manner into the valve chamber 12 and carries a valve element 19 at its lower end. The lower housing 11A comprises a bottom wall 12a and a cylindrical side wall 12b having an upper end secured to the partition 16. The side wall 12b is provided with a pair of radially inwardly projecting annular valve seats 20 and 21 located, respectively, above and below the valve element 19. An exhaust gas inlet 22 is provided in the bottom wall 12a of the lower housing 11A. An air inlet 23 and an air/gas outlet 24 are provided in the side wall 12b and are located respectively between the partition 16 and the upper valve seat 20 and between the two valve seats 20 and 21. Another air inlet 25 is provided in the top wall 14a of the upper housing 11.

Numeral 30 indicates an air pressure control valve having a valve member 30A loaded with a compression spring 31 and an outlet 32 which communicates through a signal passage 1 with the air inlet 25 to the air chamber 14 of the valve 10. The signal passage 1 is adapted to transmit to the air chamber 14 a signal which controls the change-over of fluid flow through the valve 10. The signal passage 1 has a branch 1a extending to the air inlet 23 of the valve chamber 12 in the valve 10. The branch 1a is provided with a check valve 35 of a known structure which is adapted to permit fluid flow only in a direction from the pressure control valve 30 to the valve chamber 12. The source of air under pressure to the valve 10 comprises an air pump 36 driven by the engine and having an outlet 36a communicating through a passage 2 with the inlet 33 of the pressure control valve 30 and an inlet 36b communicating through a passage 3 with an air cleaner 37.

The invention further includes a flow rate control valve 50 comprising an upper housing 51 and a lower housing 51A defining a cylindrical valve chamber 52. The upper housing 51 is provided with a diaphragm 53 which defines a negative pressure chamber 54 communicating with an intake manifold 38 and an atmospheric pressure chamber 55 maintained in fluid-tight relationship to the negative pressure chamber 54. The atmospheric pressure chamber 55 is sealed against the valve chamber 52 by a partition 56. A compression spring 57 is provided in the negative pressure chamber 54. A valve stem 58, carried on the diaphragm 53 at its upper end, extends downwardly through the partition 56 in a fluid tight manner into the valve chamber 52 and carries a pair of vertically spaced valve elements 59 and 60 adjacent to its lower end. The valve elements 59 and 60 are adapted to alternatively rest on an annular valve seat 61 provided therebetween in the valve chamber 52. Numeral 62 indicates an inlet provided in the bottom wall 52a of the lower housing 51A and communicating through a passage 4 with the outlet 24 of the fluid flow changeover valve 10. An outlet 63 located in the side wall 52b of the lower housing 51A communicates with the intake manifold 38 through a passage 5. The upper housing 51 has a port 64 opening into the negative pressure chamber 54 and communicating with the intake manifold 38 through a signal passage 6. The signal passage 6 is adapted to transmit to the negative pressure chamber 54 a signal representing the negative pressure in the intake manifold 38 for controlling the flow rate of air or exhaust gas or both through the flow rate control valve 50.

The exhaust gas inlet 22 of the fluid flow changeover valve 10 is communicated through a passage 7 to an exhaust gas recirculating outlet 39 located between exhaust ports 41 and an exhaust manifold 42. Numerals 40 and 43 indicate intake ports and a carburetor, respectively. Broken lines in FIG. 1 show a known system for supplying additional air into the outlet side of the engine as hereinbefore described, which system does not form a part of this invention.

Description will now be turned to the operation of the apparatus of the invention under various operational conditions of the engine.

(A) When the engine rotates at a low speed, the pressure of air from the air pump 36 is lower than a predetermined value at which the pressure control valve 30 is designed to open. Since the pressure control valve 30 remains closed, the pressure of air in the air chamber 14 of the valve 10 remains so low that the diaphragm 13 is maintained in its upper position under the action of the compression spring 17. The valve element 19 rests against the upper valve seat 20, whereby communication between the air inlet 23 and the outlet 24 does not exist, while communication between the exhaust gas inlet 22 and the outlet 24 is maintained. Thus, a portion of exhaust gas is recirculated from the recirculating outlet 39 into the intake manifold 38 through the passage 7, the valve 10, the passage 4, the valve 50 and the passage 5. The fuel-air mixture supplied from the carburetor 43 is mixed with the recirculated exhaust gas, whereby the combustion temperature in the engine cylinders is lowered and the amount of NOx emission is reduced. The flow rate control valve 50 is adapted for operation by a known means not shown to shut off or control the flow of exhaust gas into the intake manifold 38 in response to the operational conditions of the engine.

(B) When the engine rotates at a high speed, the pressure of air from the air pump 36 becomes equal to or higher than the predetermined value, and forces the pressure control valve 30 to open against the action of the spring 31, so that air flows through the signal passage 1 and its branch 1a into the air chamber 14 and the valve chamber 12, respectively, of the valve 10. The air thus entering the chamber 14 lowers the diaphragm 13 with deformation of the spring 17 to some extent, whereby the valve member 19 is disengaged from the upper valve seat 20 to establish fluid communication between the inlet 23 and the outlet 24. While the air pressure in the chamber 14 is lower than a predetermined value at which the compression spring 17 is deformed to its maximum extent, the valve element 19 stays between the two valve seats 20 and 21, and both of air and exhaust gas flow out through the outlet 24. When the air pressure in the air chamber 14 reaches the predetermined value and the compression spring 17 is further deformed, the valve element 19 is engaged with the lower valve seat 21, whereby the flow of exhaust gas into the valve chamber 12 is stopped and only air is supplied into the intake manifold 38 through the valve 10, the passage 4 and the flow rate control valve 50. Accordingly, the fuel-air mixture from the carburetor 43 is diluted and a lean fuel-air mixture is supplied into the engine cylinders. Thus, the fuel consumption in the engine is decreased and any otherwise possible overheating of the exhaust gas purifying apparatus, including a catalyst or a reactor, is prevented. Furthermore, any unsteady combustion in the cylinders which might occur if the recirculated exhaust gas mixed into the diluted fuel-air mixture is prevented.

In the aforesaid embodiment, the air pressure generated by the air pump 36 is used for operation of the fluid flow changeover valve 10. Alternatively, the valve 10 may be designed for operation in response to a signal representing the negative pressure in the venturi portion of the carburetor 43 or the negative pressure prevailing behind the throttle valve in the carburetor which varies with the degree of the throttle valve opening. An electric signal reflecting the engine or automobile speed may also be used to operate the fluid flow changeover valve 10. In case such a negative pressure is employed as a signal for operation of the valve 10, however, it is needless to say that the compression spring 17 should be installed in the upper chamber 14 in which a lower pressure now prevails than in the lower chamber 15, if the construction of the valve 10 is to be kept intact in every other respect.

A pressure signal delay valve may be provided in the signal passage 1 in order to delay introduction of air into the intake manifold 38.

It will also be understood that although the flow rate control valve employed in the embodiment as hereinabove described is of the diaphragm operated type designed for operation in response to variation in negative pressure in the intake manifold 38, it is possible to use such a valve of any other type, with or without a diaphragm, best suited for the control signals to be applied, including electric signals reflecting the temperature of engine cooling water, or the engine or automobile speed, transformed into electric signals in order to control the flow rate of air or exhaust gas or both.

FIG. 4 shows another form of the fluid flow changeover valve having no diaphragm, as generally indicated at 70. The valve 70 comprises a generally totally closed, cylindrical valve housing 71. The valve housing 71 comprises a top wall 71a, a bottom wall 71b and a cylindrical side wall 71c. The top wall 71a is provided with an air inlet 72, the bottom wall 71b with an exhaust gas inlet 73 and the side wall 71c with a fluid outlet 74 in the upper portion of the housing 71. An annular valve seat 75 radially inwardly projects from the internal surface of the housing 71 and is somewhat spaced below the fluid outlet 74. A circular piston-like valve member 76 is provided in the housing 71 coaxially with the air inlet 72. An integral stem 79 extends downwardly from the valve member 76. A compression spring 77 encircles the valve stem 79 and extends between the valve member 76 and the bottom wall 71b of the housing 71. An O-ring 78 is secured around the peripheral edge of the valve member 76 to maintain the valve member 76 in sealing contact with an intersurface portion 71d of the housing 71 normally under the action of the compression spring 77. Thus, the internal surface portion 71d provides an additional valve seat. The air inlet 72 may be connected to a source of pressurized air similar to the air pump 36 in FIG. 1. The exhaust gas inlet 73 may be connected to an exhaust gas outlet from the engine and the fluid outlet 74 may communicate with an intake manifold. The valve 70 of FIG. 4 operates in a manner similar to the valve 10 shown in FIGS. 1 and 2, except that air under pressure directly acts on the valve member 76. Assuming that a pressure control valve which is similar to that shown in FIG. 1 at 30 is interposed between the air source and the air inlet 72, the valve member 76 stays in its first position illustrated in FIG. 4 until the output pressure of the air source reaches a first predetermined value at which the compression spring in the pressure control valve is deformed to permit air flow through the valve. The air pressure acts on the valve member 76 and forces it downward into a second position in which the O-ring 78 is disengaged from the internal surface portion 71d of the housing 71 to create fluid flow between the air inlet 72 and the fluid outlet 74, as well as between the exhaust gas inlet 73 and the fluid outlet 74 as in the first position of the valve member 76. Upon further elevation of the air pressure to its second predetermined value, the compression spring 77 is further deformed and allows the valve member 76 to move into its third position and rest against the valve seat 75, whereby fluid flow is maintained only between the air inlet 72 and the fluid outlet 74 to transfer only air into the intake manifold through the apparatus of this invention.

The fluid flow changeover valve 10 and the flow rate control valve 50 may be replaced by a single valve which is adapted for both fluid flow changeover and flow rate control.

What is claimed is:

1. An exhaust gas purifying apparatus for an internal combustion engine having an intake manifold and an exhaust manifold, including a source of pressurized air for supplying primary air to said intake manifold and a fluid flow changeover valve coupling said source of pressurized air to said intake manifold, said valve comprising:
   a housing defining a valve chamber therein and provided with a first port in fluid communication with said source of pressurized air through a first passage, a second port in fluid communication with said exhaust manifold through a second passage and a third port in fluid communication with said intake manifold through a third passage;
   a valve element in said valve chamber;
   valve seat means in said housing;
   said valve element responsive to variations in pressure of said primary air for selective movement among three positions relative to said ports, said valve element being movable into a first position which allows fluid communication only between said second and third ports through said valve chamber when said primary air pressure is less than or equal to a first predetermined value, a second position which allows fluid communication both between said first and third ports and between said second and third ports through said valve chamber when said primary air pressure is higher than said first predetermined value, but lower than a second predetermined value, and a third position which allows fluid communication only between said first and third ports when said primary air pressure is greater than or equal to said second predetermined value, said first and second ports each defining a fluid inlet to said valve chamber and said third port a fluid outlet therefrom.

2. The exhaust gas purifying apparatus as defined in claim 1, wherein said source of pressurized air is an air pump connected by a belt with said engine and adapted to be driven by said engine.

3. The exhaust gas purifying apparatus as defined in claim 1, further including a flow rate control valve provided in said third passage between said third port and said intake manifold and having a diaphragm movable in response to variation in a negative pressure prevailing in said intake manifold to regulate the amount of fluid flow from said fluid flow changeover valve to said intake manifold.

4. The exhaust gas purifying apparatus as defined in claim 1, wherein said fluid flow changeover valve further comprises:
   an auxiliary housing connected to said valve chamber defining housing in a fluid-tight manner;
   a diaphragm defining in said auxiliary housing a first chamber in fluid communication with said pressurized air source and a second chamber located between said first chamber and said valve chamber and separated from said valve chamber by a partition, said second chamber being at atmospheric pressure;
   a compression spring extending between said diaphragm and said partition;
   a valve rod secured to said diaphragm at one end and extending through said partition in a fluid-tight, but slidable manner into said valve chamber;
   said valve element carried on the other end of said valve rod; and
   said valve seat means comprising a pair of seat rings axially spaced one above the other, said valve element and said third port being located between said seat rings, said first port being located between said partition and said one seat ring, said second port being located on the opposite side of said other seat ring from said valve element, said valve element being adapted in said first position for resting on said one seat ring, while resting on said other seat ring in said third position.

5. The exhaust gas purifying apparatus as defined in claim 4, further including a fourth passage, a check valve provided in said first passage extending between said source of pressurized air and said first port and adapted to permit said air to flow only in a direction from said source to said first port, said auxiliary housing first chamber having a port communicating with said first passage through said fourth passage joining said first passage upstream of said check valve.

6. The exhaust gas purifying apparatus as defined in claim 5, further including a pressure control valve provided in said first passage between said source and said fourth passage.

* * * * *